United States Patent [19]

Swartzendruber et al.

[11] Patent Number: 4,930,593
[45] Date of Patent: Jun. 5, 1990

[54] PIVOTING SEAT STRUCTURE FOR A FRONT MOUNTED MOWER

[75] Inventors: James A. Swartzendruber, West Bend; Dale R. Dobberpuhl, Horicon, both of Wis.

[73] Assignee: Deere & Company, Moline, Ill.

[21] Appl. No.: 327,947

[22] Filed: Mar. 23, 1989

[51] Int. Cl.⁵ ........................ B62D 25/10; B62D 39/00
[52] U.S. Cl. .................................. 180/89.17; 296/65.1
[58] Field of Search ...................... 180/89.17; 296/65.1

[56] References Cited

U.S. PATENT DOCUMENTS

| | | | |
|---|---|---|---|
| 3,583,518 | 6/1981 | Bichel et al. | 280/89.17 |
| 4,312,418 | 1/1982 | Rittman | 280/89.17 |

Primary Examiner—Kenneth R. Rice

[57] ABSTRACT

Pivoting seat structure for a front mounted mower includes a main support plate pivotally connected to the lower frame for rotation about a first transverse axis and a seat including a mounting plate connected to the support plate for rotation about a second transverse axis offset in the fore-and-aft direction from the first axis. Latch and prop rod structures secure the seat in position offset above a portion of the vehicle wherein access is provided to drive structure located below the operator station. In one embodiment, the seat moves rearwardly over the engine hood and is supported in a position offset from the hood. In a second embodiment, the seat moves forwardly and upwardly over the steering column.

9 Claims, 3 Drawing Sheets

PIVOTING SEAT STRUCTURE FOR A FRONT MOUNTED MOWER

BACKGROUND OF THE INVENTION

The present invention relates generally to seat structure, and more specifically, to seat structure for the forward portion of a front mounted mower which pivots away from the floor to allow access to components located below the seat.

In a vehicle such as a front mounted mower, transmission and power take-off components are generally located directly below the seat, and the seat limits access to these components. In a typical arrangement such as provided on the John Deere Model 915 Front Mounted Mower and described in U.S. Pat. No. 4,696,508, the seat is hinged at its forward extremity and may be pivoted forwardly and upwardly until the seat back contacts the steering wheel which is supported from an upright column directly in front of the seat. A seat latching mechanism maintains the seat in a preselected one of a plurality of positions. Although such an arrangement provides some seat control and access to the area between the engine and the implement, full access is impeded by the seat which still angles upwardly over the opening. Another type of seat structure for providing access to an opening below the operator station is shown, for example, in U.S. Pat. No. 4,364,602 wherein a seat assembly is mounted on a pair of fore-and-aft spaced shafts and includes a pair of latches to selectively release the seat structure and to permit the seat to be rotated upwardly and rearwardly to rest on a portion of the vehicle behind the operator station. Although such an arrangement provides better access to the area below the operator station, at least two latches are required which add to the complexity of the structure, and no positive support is provided for maintaining the structure in the various positions of rotation relative to the two pivotal axes. Since the seat comes to rest on a portion of the vehicle itself, there is a potential for damaging the vehicle structure if the seat should be released prematurely before coming to rest in the final acess position.

With some rear-folding seat arrangements, adjustment of the seat to a rearward position to accomodate a tall operator sometimes causes interference between the seat and the portion of the vehicle immediately adjacent the rear portion of the seat during pivoting of the seat structure to the access position. Therefore, it may be necessary to provide an additional step of re-adjusting the seat forwardly before the seat can be moved to provide access to the components below the operator station.

BRIEF SUMMARY OF THE INVENTION

It is therefore an object of the present invention to provide an improved pivoting seat structure for an implement. It is a further object to provide such a structure which permits the seat to be moved a substantial distance away from the opening with a relatively few and simple steps.

It is another object of the present invention to provide an improved pivoting seat structure which is more easily controlled as it is moved between operating and access positions. It is a further object to provide such a structure which has improved support in the access position. It is still another object to provide such a structure which includes latch and prop rod structures which are selectively engageable to provide the improved support and control. It is yet another object to provide such a structure which is adjustable to support the seat in a plurality of rotated positions.

It is yet a further object of the present invention to provide an improved pivoting seat structure for an implement wherein the seat may be pivoted to provide an unencumbered access opening below the operator station and wherein the pivoting may be easily accomplished when the seat is in any of a plurality of fore-and-aft adjusted positions. It is another object to provide such a structure wherein the seat, when in the access position, extends forwardly over the steering column.

In accordance with the above objects, pivoting seat structure is provided including a seat support pivotally connected to the vehicle frame for rocking between a horizontal working position wherein the operator station is substantially closed over the drive structure located below the station. A seat includes a lower portion which is pivotally connected to the end of the seat support opposite the pivotal connection with the frame. The seat freely pivots about the second transverse axis between a normal working position wherein the lower portion of the seat lies generally parallel to the seat support, and an offset position wherein the lower portion approaches an angle of approximately ninety degrees with respect to the seat support. The seat support is rotatable to an upright access position with the seat in an offset position above a portion of the vehicle and completely removed from an access opening. In one embodiment, the seat pivots upwardly and rearwardly over the vehicle hood behind the operator station. In an alternate embodiment, the first pivot is located forwardly of the seat behind the steering column, and the seat is rotatable upwardly and forwardly until it assumes a position over the steering wheel. The forward pivoting arrangement eliminates interference between the seat and the portion of the vehicle behind the seat during movement of the seat to and from the access position, even when the seat is adjusted to an extreme rearward position. The seat structure also includes a prop rod which extends between the seat and the seat support to retain the seat in an angularly rotated position relative to the support plate. The rod is pivotally connected to the support plate and is extendable upwardly into position against a clip located on the seat near the second pivotal axis. An adjustable latch structure is provided between the seat support and the vehicle frame for selectively maintaining the seat support in a plurality of angularly rotated positions relative to the vehicle frame. The latch structure is easy to operate and provides increased control of the seat as it is moved to and from the access position. In addition, the structure provides good support for the seat in the access position to eliminate the need for the seat to rest on the vehicle structure itself and to prevent accidental dropping of the seat onto the vehicle structure.

These and other objects, features and advantages of the present invention will become apparent to one skilled in the art upon reading the following detailed description in view of the drawings.

DESCRIPTION OF THE PREFERRED EMBODIMENT

Figure 1:
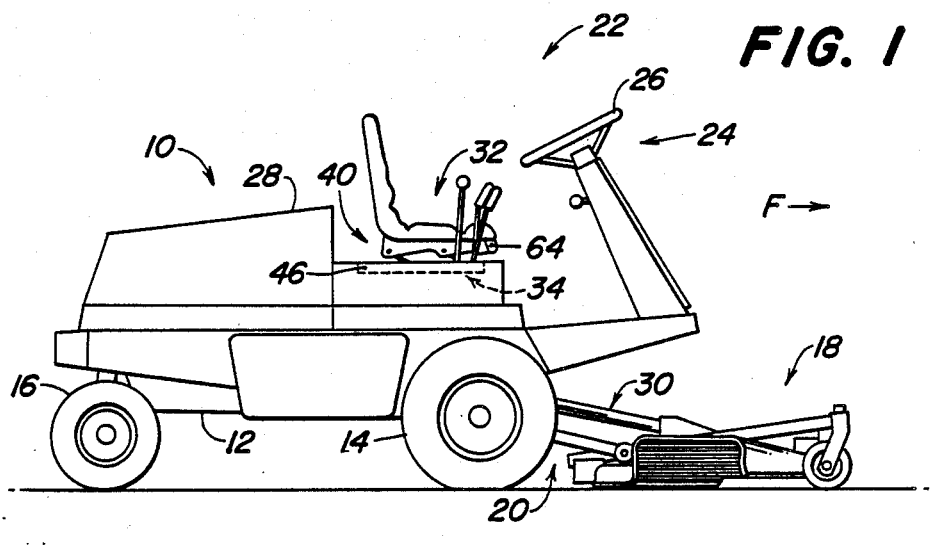
FIG. 1 is a side view of a front-mounted mower with the pivoting seat structure of the present invention attached thereto.

Referring now to FIG. 1, therein is shown a front mounted mower 10 having a frame 12 supported for forward movement over the ground by forward drive wheels 14 and rear steerable wheels 16. An implement 18 is connected to the forward end of the frame 12 by lift structure 20. An operator station 22 is located at the forward end of the frame 12 above the drive wheels 14. A steering column 24 extends upwardly and rearwardly from a location generally over the implement 18 and includes a steering wheel 26.

An engine (not shown) is housed under a hood or housing 28 located rearwardly of the operator station 22. Drive structure is connected between the engine and the implement 18, and extends under the operator station 22 and is operably connected to implement drive structure indicated generally at 30. The operator station 22 includes pivoting seat structure 32 connected to the vehicle frame 12 for movement between a normal working position (FIG. 1 and solid lines of FIG. 2) and an access position (broken lines of FIG. 2) to provide access to drive components below the operator station 22 through an opening indicated generally at 34.

The pivoting seat structure 32 includes seat support structure 40 with a support plate 42 pivotally connected at location 44 to the frame 12 for rocking about a first transversely extending axis 46. A seat suspension assembly 48 is connected to the support plate 42 for rocking therewith about the axis 46. The seat suspension assembly 48 is generally of the type shown in U.S. Pat. No. 4,717,227, issued 22 Dec. 1987, and of common ownership with the present application. The assembly 48 includes an adjustable torsion support 52 as well as rail supports 54 for facilitating fore-and-aft adjustment of the seat structure 32. If further details of the seat suspension assembly are desired, reference may be had to the aforementioned U.S. Pat. No. 4,714,227. A seat mounting plate 58 is pivotally connected at locations 62 to the seat suspension assembly 48 for rocking relative to the assembly about a second transverse axis 64 offset in the fore-and-aft direction from the first axis 46.

A seat 66 includes a lower portion 68 fixed to the seat mounting plate 58. A seat back 70 extends upwardly from the lower seat portion 68 adjacent the forwardly extending fire wall of the housing 28. The seat mounting plate 58 and attached seat 66 are freely rockable with respect to the suspension assembly 48 for rotation about the pivotal axis 64, with the weight of the seat structure normally biasing the seat 66 to a working position wherein the lower seat portion 68 is generally horizontal. A forwardly located spring 72, part of a seat interlock system, normally biases the plate 58 to a slightly upwardly rocked position when the operator is off of the seat 66. When the operator positions himself on the seat, the plate 58 moves downwardly against the bias from the position shown in FIG. 5 to a substantially horizontal position against the suspension assembly 48.

Figure 6:
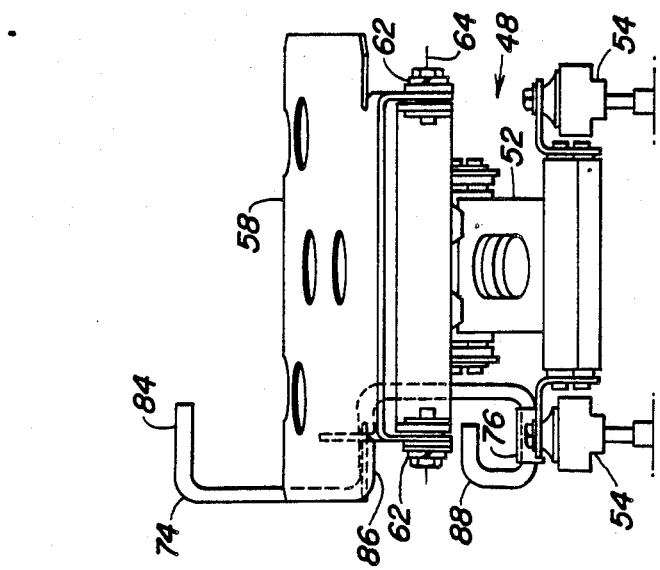
FIG. 6 is a view of the left-hand side of the structure of FIG. 5.
Figure 5:
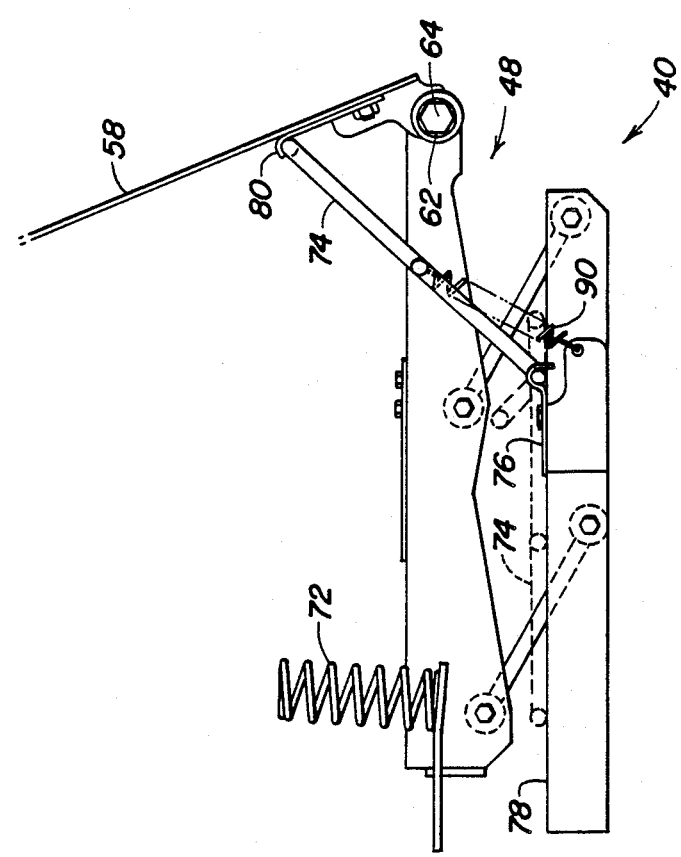
FIG. 5 is a side view showing the operation of the prop rod structure extending between the seat support and the vehicle seat.

A seat prop rod 74 (FIGS. 5 and 6) is pivotally connected by a bracket 76 to one of a pair of angles 78 forming the lower portion of the seat suspension assembly 48. The prop rod 74 is rockable about a transversely extending axis from a storage location generally parallel with the angle 78 to a seat supporting position (FIG. 5). A clip 80 is attached to the lower portion of the seat mounting plate 58, and the prop rod 74 includes an inwardly bent portion 84 which engages the underside of the clip 80 as shown in FIG. 5 when the seat is in the pivoted position. The rod 74 is directed inwardly at location 86 and downwardly to the pivotal connection with the bracket 76. A lower end portion 88 extends upwardly and inwardly from the pivotal axis to contact the angle 78 and act as a stop in the support position as shown by the dotted lines in FIG. 5. A spring 90 is connected to the end 88 and provides an over-center to bias on the rod 74 to selectively maintain the rod in the support or the storage position.

Figure 3:
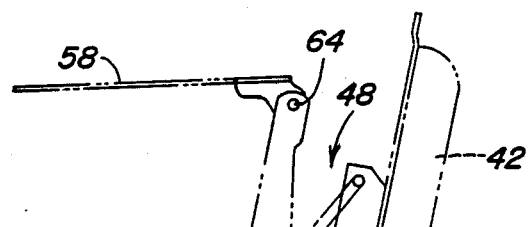
FIG. 3 is a side view of the portion of the pivoting seat structure showing the operation of the latch located between the seat support and the vehicle frame.
Figure 3:
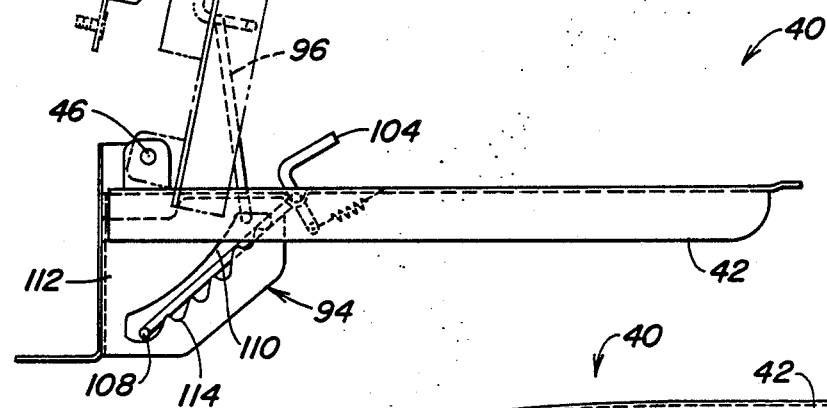
Figure 4:
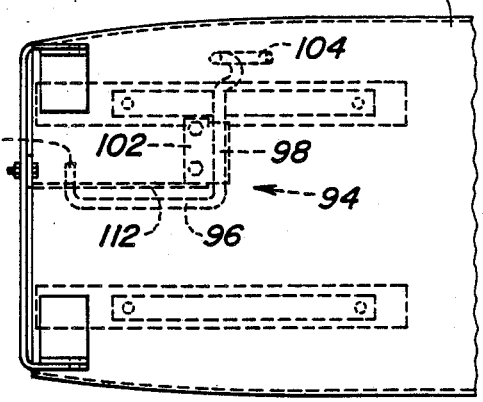
FIG. 4 is a top view of the structure shown in FIG. 3.

Engageable latch structure 94 is provided between the vehicle frame 12 and the seat support plate 42 for selectively supporting the plate in one of a plurality of angularly rotated positions. As best seen in FIGS. 3 and 4, the structure 94 includes a latch rod 96 having a transversely extending portion 98 connected for pivoting by a bracket 102 to the underside of the plate 42. The rod 96 extends outwardly to a hand grip portion 104 near the side of the seat structure. The opposite side of the rod 96 extends downwardly from a 90 degree bend location to an inwardly bent end 108 which extends through an upwardly and forwardly inclined slot 110 in an upright adjusting plate 112 centrally located below the seat and fixed to the vehicle frame 12. As the support plate 42 is rotated upwardly about the pivotal axis 46, the end 108 moves upwardly and forwardly in the slot 110. The slot 110 includes a plurality of notches 114 along its length to support the end 108 and prevent downward movement of the plate 42 from an upwardly rotated position. The seat support structure 40 can therefore be selectively secured in one of a plurality of rotated positions above the access opening 34. The engagement of the latch rod 96 with the notched slot 110 prevents the seat from being accidentally dropped to the operating position once it is rotated upwardly. To release the support plate 42 and move it back to the operating position, the operator grasps the grip portion 104 and pivots the end 108 upwardly about the axis of the portion 98. This releases the end 108 from the notches and permits the plate 42 to rotate downwardly.

Figure 2:
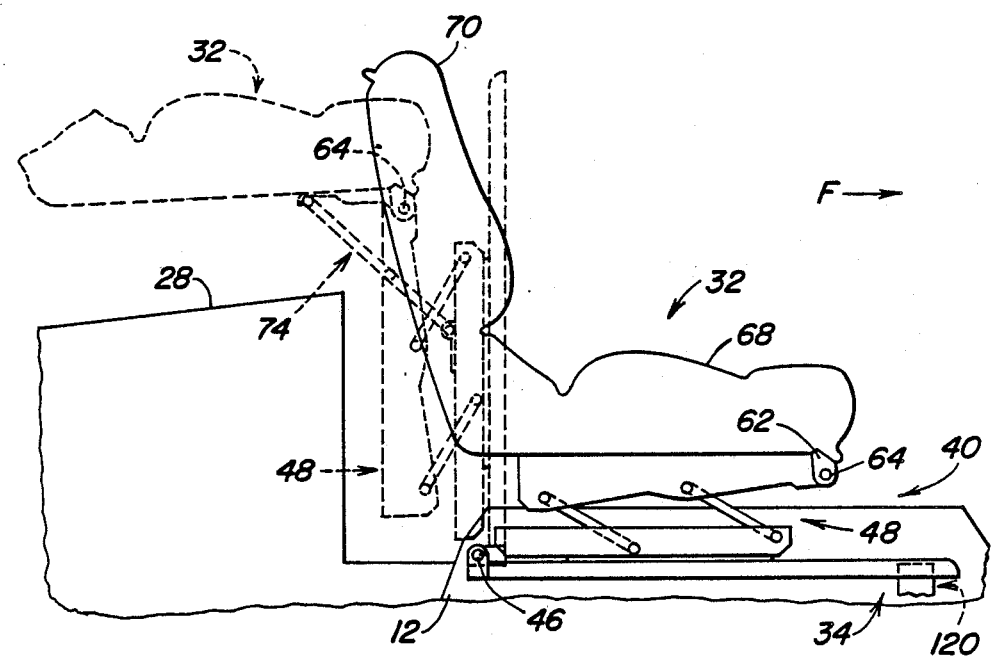
FIG. 2 is an enlarged side view of a portion of the mower of FIG. 1 showing the pivoting seat structure in the working position (solid lines) and indicating the access position (broken lines).

In operation, assuming the seat is in the normal operating position as shown in FIG. 1 and the operator wishes to gain access through the opening 32 to the drive structure under the operator station 32, the operator first lifts the seat to rotate if forwardly about the pivotal axis 64. The seat prop rod 74 is lifted to the over-center position and positioned against the clip 80 to prevent relative rotation between the seat and the seat suspension assembly 48. Thereafter, the operator pivots the entire seat support structure 40 upwardly and rearwardly about the pivotal axis 46 until the seat 32 is positioned above the engine housing 28. The latch rod 96 retains the seat support structure 40 in the upwardly rotated access position (FIG. 3 and broken lines of FIG. 2). In the access position, the support plate 42 is substantially upright and the seat mounting plate 58 extends rearwardly therefrom and is supported in position above the housing 28 by the seat prop rod 74. With the seat 32 secured in the access position, the operator is free to work on the drive structure and other equipment located below the operator station relatively unimpeded.

To move the seat back to the normal operating position as shown in FIG. 1, the operator rotates the hand grip portion 104 of the latch rod 96 in a clockwise direction (FIG. 3) to lift the end 108 from the notch 114. The seat suspension assembly 48 is then rotated downwardly to the general horizontal position over the opening 34. Thereafter, the operator pivots the seat slightly about the axis 64 to release the seat prop rod 74 from the clip 80. The prop rod is rotated to its storage position over the angle 78 and the seat is rotated downwardly to the position over the seat suspension assembly 48. A suspension latch assembly 120 may be provided adjacent the forward end of the seat suspension assembly 48 to lock the assembly against rotation about the pivotal axis 44 during normal operation of the mower 10. However, no latch is provided to prevent rotation of the seat 32 about the second pivotal axis 64 to ensure proper operation of the seat interlock system and to facilitate movement of the seat to the access position when necessary.

Figure 7:
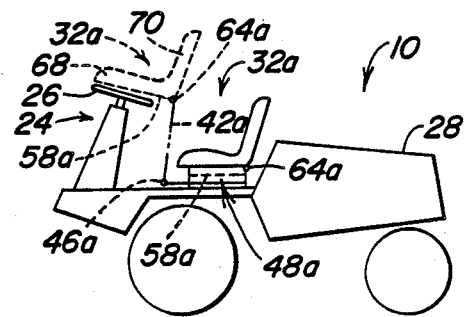
FIG. 7 is a schematic side view of an alternate embodiment of the invention wherein the seat support structure pivots forwardly over the steering column of the vehicle.

In the alternate embodiment of FIG. 7, the support plate 42a is pivotally connected at a forward location for pivoting about a transverse axis 46a located between the seat and the steering column 24. The seat mounting plate 58a is pivotally connected for rotation about an axis 64a offset rearwardly from the opening 34. The seat suspension assembly 48a is generally the same as shown and described above with respect to the assembly 48. To move the seat from the normal operating position to the access position, the support plate 42a is rotated upwardly and forwardly about the forward pivot 46a toward an upright position and the seat plate 58a is rocked rearwardly about the rear pivot axis 64a to the position shown in FIG. 7 with the seat 32a located over the steering wheel 26. A latch rod and seat prop rod (not shown) similar to that described above the latch and prop rods 96 and 74 may be provided to support the seat in the access position The distance between the pivot axes 46a and 64a is approximately equal to the vertical distance between the axis 46a and the steering wheel 26 so that the support plate 42a moves the seat 32a over the steering column 24. The seat 32a is maintained generally in the same attitude in both the operating and access positions. In the access position, both the plate 42a and the back of the seat 32a are generally vertical for unimpeded access to the opening 34.

Having described the preferred embodiment, it will be apparent that modifications can be made without departing from the scope of the invention as defined in the accompanying claims.

I claim:

1. In a vehicle having a frame supported for forward movement over the ground, an operator station including a forward steering column, an engine located rearwardly of the operator station, a drivable implement supported forwardly of the operator station, and drive structure extending between the engine and implement under the operator station, seat structure comprising:

a fore-and-aft extending seat support pivotally connected to the frame at one of its ends for rocking both the horizontal working position wherein the operator station is substantially closed over the drive structure, and an upright access position wherein the operator station opens downwardly toward the drive structure;

a seat including a lower portion and an upright seatback portion, and means pivotally connecting the seat to the end of the seat support opposite said one of its end for freely pivoting about a transverse axis between a seating position with the lower portion generally parallel to the seat support and an offset position wherein the seatback approaches an attitude generally parallel to the seat support;

means for securing the seat support in the upright access position with the seat in the offset position; and wherein the seat support is pivotally connected at its forward end to the vehicle frame rearwardly of the steering column whereby the lower portion of the seat extends over the steering column when the seat support is in the access position when the seat in the offset position.

2. In a vehicle having a frame supported for forward movement over the ground, an operator station including a forward steering column, an engine located rearwardly of the operator station, a drivable implement supported forwardly of the operator station, and drive structure extending between the engine and implement under the operator station, seat structure comprising:

a fore-and-aft extending seat support pivotally connected to the frame at one of its ends for rocking both the horizontal working position wherein the operator station is substantially closed over the drive structure, and an upright access position wherein the operator station opens downwardly toward the drive structure;

a seat including a lower portion and an upright seatback portion, and means pivotally connecting the seat to the end of the seat support opposite said one of its ends for freely pivoting about a transverse axis between a seating position with the lower portion generally parallel to the seat support and an offset position wherein the seatback approaches an attitude generally parallel to the seat support;

means for securing the seat support in the upright access position with the seat in the offset position; and wherein the seat support is pivotally connected at its forward end to the vehicle frame whereby the lower portion of the seat extends over the engine when the seat support is in the access position with the seat in the offset position, said means for securing including means extending between the seat and the seat support for restricting downward rocking of the seat toward the engine. In the drawings:

3. The invention as set forth in claim 2 wherein the means extending includes a rod selectively engageable between the seat lower portion and the seat support.

4. The invention as set forth in claim 3 wherein the means for securing the seat support further includes a fixed length member pivotally connected to the seat support and having a latching end selectively positionable relative to the vehicle frame for securing the seat support in one of a plurality of preselected angular positions relative to the vehicle frame.

5. The invention as set forth in claim 4 wherein the means extending supports the seat in the offset position as the seat support is rocked between the working and access positions.

6. In a vehicle having a frame supported for forward movement over the ground, an operator station including a forward upright steering column, an engine located rearwardly of the operator station, a drivable implement supported forwardly of the operator station, and drive structure extending between the engine and implement under the operator station, seat structure comprising:

a fore-and-aft extending seat support pivotally connected to the frame at its forward end for rocking between a horizontal working position wherein the operator station is substantially closed over the drive structure, and an upright position wherein the operator station opens downwardly toward the drive structure;

a seat, and means pivotally connecting the seat to the aft end of the seat support for pivoting about a transverse axis between a normal operating position and an offset position; and wherein when the seat is in the offset position with the seat support in the upright access position, the seat extends over the steering column.

7. The invention as set forth in claim 6 wherein the seat support is rotatable approximately 90 degrees upwardly from the working position and means for maintaining the seat in generally the same attitude in both the working and access positions.

8. The invention as set forth in claim 6 wherein the transverse axis is offset rearwardly from the pivotal connection of the seat support with the frame a distance approximately equal to the vertical distance between the top of the steering column and the pivotal connection.

9. The invention as set forth in claim 7 wherein the seat includes an upright seat back extending generally vertically from the seat support when the seat support is in the access position.

* * * * *